United States Patent Office 3,053,912
Patented Sept. 11, 1962

3,053,912
SEPARATION OF ISOMERIC AROMATIC COMPOUNDS USING A STEAM TREATED WERNER-TYPE COMPLEX
Alan Marchant, Norton-on-Tees, England, assignor to Imperial Chemical Industries Limited, London, England, a corporation of Great Britain.
No Drawing. Filed Nov. 16, 1959, Ser. No. 852,989
Claims priority, application Great Britain Nov. 14, 1958
2 Claims. (Cl. 260—674)

This invention relates to the separation of organic compounds and particularly to the separation of organic compounds which while differing in molecular configuration, have similar chemical and physical properties and are thus difficultly separable by conventional methods such as fractional distillation and fractional crystallisation.

It is known to separate mixtures of organic compounds by bringing the mixture into contact with a solid Werner-type complex compound of a metal salt and a basic nitrogen compound whereby at least one component of the mixture is selectively absorbed by the complex to form a solid clathrate-type compound which may be separated for example, by filtration, from the unabsorbed components of the mixture. The clathrate-type compound may then be decomposed to recover the absorbed component or components.

It is very desirable that the decomposition of the clathrate-type compound is carried out in such a way that substantially all the absorbed material is recovered and the Werner-type complex is obtained in a form suitable for re-use in the process.

The absorbed material can be satisfactorily recovered by decomposing the clathrate-type compound with steam. However, degradation of the Werner-type complex with loss of basic nitrogen compound also frequently occurs to give a degradation product which is unsuitable for further use as a selective absorbent.

The degradation of the Werner-type complex compound may be inhibited by the use of steam containing a basic nitrogen compound. However, under these conditions, separation of the absorbed material and the Werner-type complex is incomplete and thus the absorbed material is only partly recovered while the Werner-type complex still contains absorbed material which reduces its efficiency as an absorbent.

We have now found that if the clathrate-type compound i.e. the Werner-type complex compound plus absorbed material, is decomposed by steam and the degradation product of the Werner-type complex compound so formed is treated with a basic nitrogen compound substantially complete recovery of the absorbed material may be combined with the formation of a Werner-type complex compound which is even more active in the selective absorption process than the original Werner-type complex compound and which is therefore very suitable for use in the process. While this regenerated Werner-type complex compound may have the same molecular composition as the original Werner-type complex compound, X-ray examinaiton indicates that it has a different structural configuration.

We have also found that the same or a very similar Werner-type complex compound highly active in the absorption of organic compounds may be formed by degrading a Werner-type complex compound with steam and treating the degradation product with a basic nitrogen compound.

According to the present invention therefore, there is provided a process for the separation of a mixture of organic compounds in which the said mixture is brought into contact with a solid Werner-type complex compound of a metal salt and a basic nitrogen compound to effect the selective absorption of at least one component of the mixture and in which at least a proportion of the Werner-type complex compound has been formed by degrading a Werner-type complex compound with steam and treating the degradation product with a basic nitrogen compound.

It will be understood that some Werner-type complex compound which has not previously been treated with steam may be used in the process of the invention.

There is also provided according to the invention a process for the separation of a mixture of organic compounds which comprises the steps of successively bringing the mixture into contact with a solid Werner-type complex compound of a metal salt and a basic nitrogen compound to effect selective absorption of at least one component of the mixture, separating the complex compound containing absorbed material from the residual components of the mixture, treating it with steam to recover absorbed material and a degradation product of the Werner-type complex compound, treating the degradation product with a basic nitrogen compound to form a Werner-type complex compound and returning the complex compound thus formed to the first step of the process.

The process of the invention is particularly applicable to the separation of mixtures of isomeric aromatic hydrocarbons, for example, mixtures of ortho-, meta-, and para-xylenes or cymenes.

It is preferred that the basic nitrogen compound used in treating the degradation product of the Werner-type complex compound is the same as that present in the original Werner-type complex compound.

The Werner-type complex compound may be formed by treating a metal salt with a basic-nitrogen compound and this operation may be carried out prior to the process of the invention or form part of the first stage thereof.

The metal salt may be a salt of a metal of groups 1B, 2B 6B, 7B and 8B of the periodic table such as iron, cobalt, nickel, copper, manganese and mercury in which the acidic radical is for example thiocyanate, isothiocyanate, cyanate, isocyanate, cyanide, sulphate, nitrate, nitrite, chloride, bromide, iodide or phosphate.

The basic nitrogen compound may be for example a mono-, di- or tri-alkylamine, an arylamine or a heterocyclic amine such as pyridine, an alkyl substituted pyridine, pyrroles and piperidine. Alkyl substituted pyridines are very suitable basic nitrogen compounds.

The particular Werner-type complex used depends on the particular compounds which it is desired to separate. We have found that a very suitable Werner-type complex for the separation of ortho-, meta- and para-substituted aromatic hydrocarbons is a complex formed from nickel thiocyanate and gamma picoline.

The amount of Werner-type complex which is used depends directly on the amount of organic compound which it is desired to absorb.

The suspension of the complex in the mixture of organic compounds should preferably be maintained in such a condition that it can be easily mixed for example by stirring. A diluent may be added as required to achieve this condition.

*Example 1*

A mixture of $C_8$ aromatic hydrocarbons containing 22% ortho-xylene, 44% meta-xylene, 19.4% para-xylene and 8.8% ethyl benzene was treated to separate para-xylene.

25 gm. of a complex of nickel thiocyanate and gamma-picoline, $Ni(gamma\text{-}picoline)_4(CNS)_2$, were shaken for 30 minutes with 100 gm. of the hydrocarbon mixture. The solid material was then filtered from the mother liquor which was found to contain 24% ortho-xylene, 45% meta-xylene, 17.6% para-xylene and 9% ethyl benzene. After allowing the filtered solid to dry in air to constant weight the absorbed material was then stripped from it using steam at 100 mm. inlet pressure, the hydrocarbon layer separated from the steam distillate and freed from gamma-picoline. The purified hydrocarbon layer contained 7.5% ortho-xylene, 8.1% meta-xylene, 75% para-xylene and 6.3% ethyl benzene.

The solid after removal of the absorbed hydrocarbons was shaken with a 10% aqueous solution of gamma-picoline until the green colour changed to blue in order to regenerate a complex nickel compound. This regenerated complex was then used in the separation of the $C_8$ hydrocarbon mixture as described above. The purified hydrocarbon layer contained 6% ortho-xylene, 7% meta-xylene, 80% para-xylene and 7% ethyl benzene.

The whole of the above procedure was repeated using 100 gm. of the complex and 100 gm. of the hydrocarbon mixture.

The following table illustrates the increased absorption of para-xylene obtained by using the regenerated complex nickel compound instead of the original complex nickel compound:

| Weight of— | | Complex compound | Percent p-xylene recovered |
|---|---|---|---|
| Complex compound, gm. | Hydrocarbon mixture, gm. | | |
| 25 | 100 | Original | 7 |
| 25 | 100 | Regenerated | 10 |
| 100 | 100 | Original | 35 |
| 100 | 100 | Regenerated | 50 |

The following X-ray data illustrates the difference between the two complexes.

| Complex original | | Complex regenerated | |
|---|---|---|---|
| d(A.) | $I/I_0$ | d(A.) | $I/I_0$ |
| 8.93 | 7 | 8.46 | 76 |
| 8.55 | 12 | 8.27 | 54 |
| 8.19 | 7 | 7.20 | 32 |
| | | 6.94 | 9 |
| 7.94 | 7 | 5.99 | 30 |
| 7.69 | 12 | | |
| 7.50 | 26 | 5.74 | 2 |
| 6.86 | 2 | 5.39 | 35 |
| | | 5.19 | 57 |
| 6.61 | 5 | | |
| 6.39 | 3 | 4.86 | 25 |
| 6.09 | 11 | 4.61 | 68 |
| | | 4.55 | 27 |
| 5.54 | 6 | | |
| 5.40 | 3 | 4.44 | 3 |
| 5.17 | 7 | | |
| | | 4.25 | 9 |
| 5.11 | 8 | 4.14 | 3 |
| 4.82 | 19 | | |
| | | 4.00 | 26 |
| 4.67 | 14 | 3.93 | 45 |
| 4.63 | 15 | 3.77 | 24 |
| 4.48 | 22 | 3.62 | 55 |
| 4.42 | 15 | 3.49 | 2 |
| | | 3.41 | 1 |
| 4.35 | 11 | | |
| | | 3.36 | 3 |
| 4.14 | 27 | 3.28 | 14 |
| 3.99 | 23 | 3.16 | 14 |
| 3.76 | 9 | | |
| 3.64 | 5 | | |
| 3.60 | 3 | | |
| 3.53 | 3 | | |
| 3.50 | 4 | | |
| 3.38 | 4 | | |
| 3.33 | 7 | | |

Example 2

A mixture of $C_{10}$ aromatic hydrocarbons containing 50% ortho-cymene and 30% para-cymene was treated to separate para-cymene using the technique described in Example 1.

60 gm. of the complex of nickel thiocyanate and gamma-picoline were shaken for 30 minutes with 100 gm. of the hydrocarbon mixture. After filtration the mother liquor was found to contain 50% ortho-cymene and 25% para-cymene while the solid material yielded a hydrocarbon mixture containing 9% ortho-cymene and 82% para-cymene.

A complex nickel compound was then regenerated as described in Example 1 and used to separate para-cymene as described above. The absorbed hydrocarbon mixture contained 8% ortho-xymene and 82% para-cymene.

The whole of the above procedure was repeated using 300 gm. of the complex compound and 100 gm. of the hydrocarbon mixture diluted with 300 gm. normal hexane.

The following table shows the increased absorption of para-cymene obtained by using the regenerated complex nickel compound instead of the original complex compound.

| Weight of— | | Complex Compound | Percent p-cymene recovered |
|---|---|---|---|
| Complex compound, gm. | Hydrocarbon mixture, gm. | | |
| 60 | 100 | Original | 11.7 |
| 60 | 100 | Regenerated | 13.0 |
| 300 | 100 | Original | 33.0 |
| 300 | 100 | Regenerated | 57.0 |

Example 3

A complex of nickel thiocyanate and gamma-picoline, Ni(gamma-picoline)$_4$(CNS)$_2$ was steamed for about 10 minutes and the degradation product thus formed treated with a 10% solution of gamma-picoline in water to regenerate a complex nickel compound. The regenerated complex was then used to separate para-xylene as described in Example 1. The purified hydrocarbon layer contained 7% ortho-xylene, 7% meta-xylene, 80% para-xylene and 6% ethyl benzene. 10% of the para-xylene was recovered as against 7% in a similar experiment using the original complex nickel compound. These figures illustrate the increased absorption of para-xylene obtained by using the regenerated complex nickel compound instead of the original complex nickel compound.

The following X-ray data illustrate the difference between the two complexes.

| Complex original | | Complex after pre-treatment | |
|---|---|---|---|
| d(A.) | $I/I_0$ | d(A.) | $I/I_0$ |
| 8.93 | 7 | 8.42 | 66 |
| 8.55 | 12 | 8.23 | 42 |
| 8.19 | 7 | | |
| | | 7.17 | 18 |
| 7.94 | 7 | 6.92 | 18 |
| 7.69 | 12 | 6.77 | 7 |
| 7.50 | 26 | | |
| | | 5.97 | 36 |
| 6.86 | 2 | | |
| | | 5.34 | 22 |
| 6.61 | 5 | 5.13 | 50 |
| 6.39 | 3 | | |
| | | 4.83 | 18 |
| 6.09 | 11 | | |
| | | 4.59 | 51 |
| 5.54 | 6 | 4.52 | 26 |
| 5.40 | 3 | | |
| 5.17 | 7 | 4.42 | 2 |

| Complex original | | Complex after pre-treatment | |
|---|---|---|---|
| d(A.) | I/I$_0$ | d(A.) | I/I$_0$ |
| 5.11 | 8 | 4.23 | 9 |
| 4.82 | 19 | 4.12 | 2 |
| 4.67 | 14 | 3.99 | 23 |
| 4.63 | 15 | 3.89 | 37 |
| 4.48 | 22 | 3.79 | 14 |
| 4.42 | 15 | 3.60 | 44 |
| 4.35 | 11 | 3.53 | 8 |
| 4.14 | 27 | 3.45 | 1 |
| 3.99 | 23 | 3.34 | 3 |
| | | 3.26 | 12 |
| 3.76 | 9 | 3.15 | 10 |
| 3.64 | 5 | | |
| 3.60 | 3 | | |
| 3.53 | 3 | | |
| 3.50 | 4 | | |
| 3.38 | 4 | | |
| 3.33 | 7 | | |

I claim:

1. A process for the separation of a mixture of isomeric aromatic hydrocarbons which comprises bringing said mixture into contact with a solid Werner-type complex compound of nickel thiocyanate and gamma-picoline to effect the selective absorption of at least one component of the said mixture, at least a proportion of the Werner-type complex compound having been previously degraded by steam and the degradation product treated with gamma-picoline to re-form a Werner-type complex compound, separating the complex compound containing absorbed material from the unabsorbed components of the mixture of organic compounds and treating the separated complex compound with steam to recover absorbed material and a degradation product of the Werner-type complex compound.

2. A process according to claim 1 wherein said degradation product is treated with gamma-picoline to form a Werner-type complex compound.

References Cited in the file of this patent
UNITED STATES PATENTS

| | | |
|---|---|---|
| 2,774,802 | Christian | Dec. 18, 1956 |
| 2,798,102 | Schaeffer et al. | July 2, 1957 |
| 2,798,103 | Schaeffer et al. | July 2, 1957 |